UNITED STATES PATENT OFFICE.

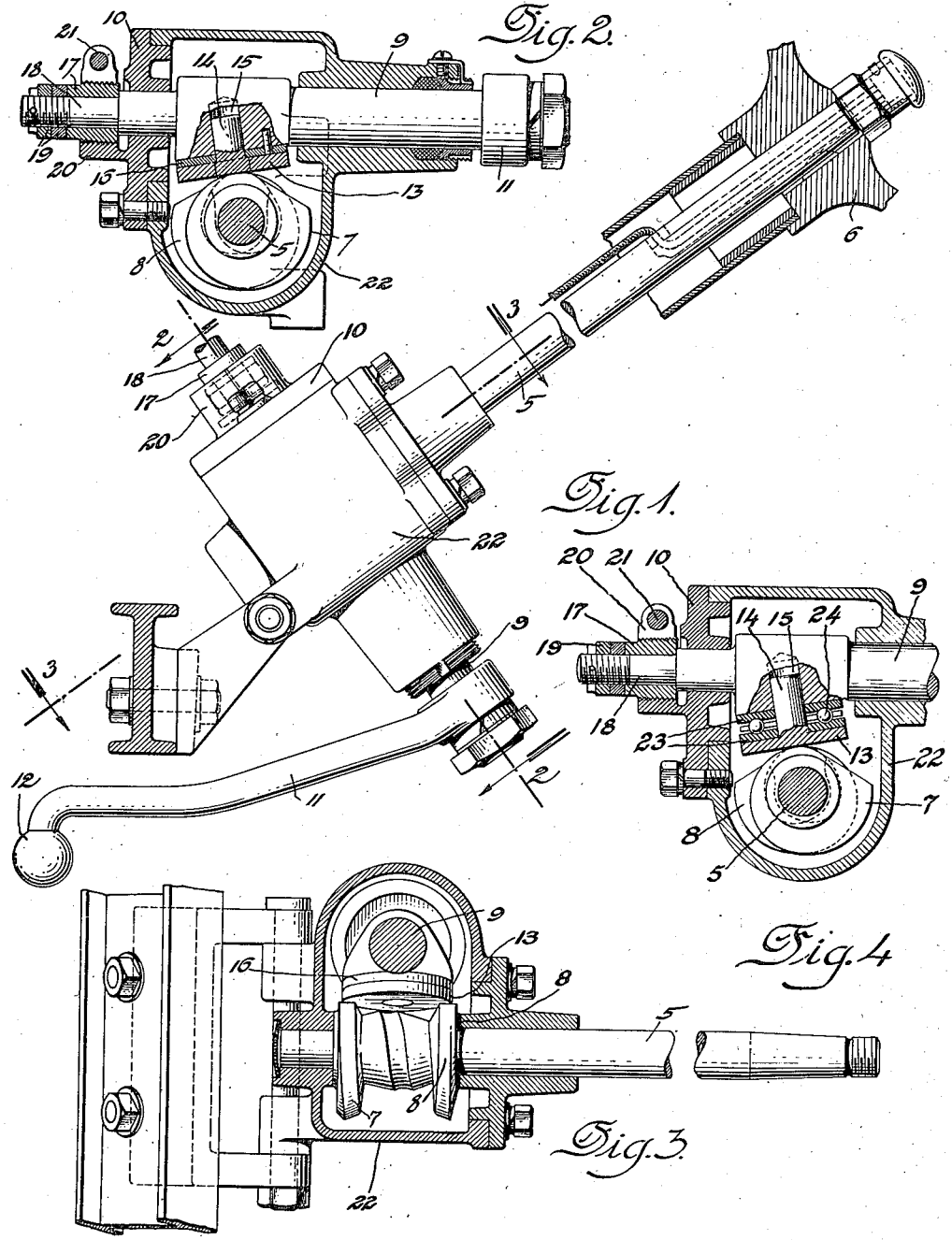

HARRY M. DENYES, OF SAGINAW, MICHIGAN, ASSIGNOR TO GENERAL MOTORS CORPORATION, OF DETROIT, MICHIGAN, A CORPORATION OF DELAWARE.

STEERING MECHANISM FOR AUTOMOBILES.

1,425,753.　　　　　Specification of Letters Patent.　Patented Aug. 15, 1922.

Application filed October 17, 1921. Serial No. 508,343.

*To all whom it may concern:*

Be it known that I, HARRY M. DENYES, a citizen of the United States, and a resident of Saginaw, county of Saginaw, and State of Michigan, have invented certain new and useful Improvements in Steering Mechanism for Automobiles, of which the following is a full, clear, concise, and exact description, such as will enable others skilled in the art to which the invention relates to make and use the same, reference being made therein to the accompanying drawings, which form a part of this specification.

My invention relates to steering mechanism for automobiles and similar self-propelled vehicles, and particularly to certain elements of the mechanism which are intermediate the lower end of the steering post or shaft whereby the vehicle is guided and the links through which movement of the steering post is communicated to the front wheels of the vehicle. Examples of steering mechanism of the type to which my invention particularly relates are present in the United States patents to H. J. Hert, No. 980,636, Jan. 3, 1911, for steering apparatus for automobiles, and H. Marles, No. 1,189,985, July 4, 1916, for steering gear for mechanically propelled vehicles.

The principal object of my invention is to provide means for adjusting the elements of the steering mechanism through which motion of the steering shaft is communicated to the oscillating shaft whereby the links which are operatively connected with the wheels of the vehicle are moved, so that looseness or lost motion in the mechanism aforesaid can be taken up and the mechanism kept tight; thus providing a steering mechanism of the type in question in which such wear as occurs may be compensated for and lost motion prevented, as well also as steering mechanism in which such slight variations in size as occur during the manufacture of the parts can be properly compensated for and a steering mechanism provided in which there will be no back-lash or lost motion between the steering shaft and the train of elements through which motion is communicated to the front wheels of the vehicle.

A further object of my invention is to provide steering mechanism of the type or class above referred to with adjusting means which will be simple in construction and effective for the purpose for which it is designed; which will not be likely to get out of order; and which may be readily and quickly manipulated to effect the adjustment of the parts properly relative to one another.

The drawing accompanying and forming a part of this specification illustrates the preferred embodiment of my invention, while the distinguishing features in which the same consists are pointed out in the concluding claims. It will be appreciated, however, that my invention includes such variations and modifications of the particular embodiment thereof illustrated as come within the scope of the concluding claims, and that the same is not limited to the precise mechanical features and to the details of the embodiment thereof chosen to illustrate the invention.

Referring now to the drawing:

Figure 1 is a fragmentary view showing the essential elements of a steering mechanism for motor vehicles made in accordance with my invention, the view being partly in section and partly in side elevation;

Figure 2 is a view showing a section upon a transverse plane indicated by the line 2—2, Figure 1; and Figure 3 is a view showing a section upon a longitudinally extending plane indicated by the broken line 3—3, Figure 1.

Figure 4 is a view similar to Figure 2, but showing a modified form of bearing between certain elements of the device.

In the drawing, the reference numeral 5 designates a rotatable steering shaft having a steering wheel 6 at its upper end, and the lower end of which is shown as supported in bearings provided within a housing or casing 22 which in turn is supported from the frame of the vehicle in any suitable way. The steering shaft 5 may be either solid or hollow according to the choice of the designer; and when hollow various other elements concerned with the control of the vehicle, such as means for throttling the mixture, for advancing the spark, etc., may be housed within the steering shaft. So far as this present invention is concerned, however, the particular construction of the shaft, that is whether solid or hollow, is immaterial.

The steering shaft 5 is provided with two cam members 7, 8, which are secured to the lower end of said shaft so as to rotate there-with and are housed within the hollow casing 22. These cams are illustrated as of the form commonly referred to as spiral or snail cams, and they are oppositely arranged relative to one another as in the patents hereinbefore mentioned; so that as the steering shaft is rotated to steer the vehicle motion will be communicated from the cams to an oscillating shaft 9 which extends transverse to the steering shaft and is supported in bearings provided in the casing 22, as best shown in Figure 2, one bearing being carried by a removable head 10 to allow the insertion of the shaft into the casing and its removal therefrom, as will be appreciated.

The transversely extending shaft 9 is provided with a bearing surface which is in contact with both the cams 7, 8 in all angular positions of the steering shaft 5, so that the said shaft 9 is oscillated as angular movement is communicated to the steering shaft and to the cams by the steering wheel; and said transverse shaft is provided with an arm 11 the free end 12 of which is connected with the usual link mechanism through which motion is transmitted to the front wheels of the vehicle to steer the same.

In the form of my invention illustrated the bearing surface with which the transverse shaft 9 is provided is upon the underside of a separate disc or plate 13 which in turn is carried by a trunnion 14 extending into a hole 15 provided in an enlarged central portion of the transverse shaft 9, this construction being employed in order to provide a steering mechanism in which a separate and renewable wear plate or disc of material best suited for the purpose is present for the cams to act upon. The disc in question is preferably free to rotate as the cams act thereupon, and a non-rotating washer 16 is shown as interposed between the disc 13 and the enlarged central portion of the shaft 9 in Figure 2; while in Figure 4 suitable ball races 23, 23, and balls 24 are interposed between the disc and shaft to thereby reduce the friction between the parts if and when the disc rotates, as will be understood.

The bearing surface carried by the oscillating shaft 9 and provided by the underside of the disc 13 in the form of my invention illustrated is inclined at an acute angle relative to the axis of the said shaft from which it follows, referring to Figures 2 and 4, that movement of the said shaft as a whole toward the left will result in looseness between the peripheral surfaces of the cams 7, 8 and the said bearing surface; while movement of the shaft in question to the right will take up such looseness as may be present between the cams and the bearing surface, due to wear or other causes, and bring the wearing surface in question into contact with or as close to the peripheral surfaces of the cam as may be desirable. It thus follows that lost motion between the cams and the wearing plate may be taken up and the parts properly adjusted by moving the said transverse shaft in the direction of its axis, and transverse or at right angles to the steering shaft 5.

Various devices may be provided for imparting longitudinal movement to the shaft 9 to thereby adjust the parts if and when it becomes necessary to do so. The preferred form of adjusting mechanism illustrated, however, comprises a threaded sleeve 17 rotatable upon a reduced end portion 18 of the said shaft, and held in place thereupon by lock nuts 19; said sleeve being in threaded engagement with an opening provided in a split collar 20 carried by the head 10 of the casing 22. This split collar is provided with a locking bolt 21 so that after the sleeve has been rotated and the bearing carried by the oscillating shaft 9 properly adjusted relative to the cams the parts may be locked in their adjusted position by tightening the bolt, which acts to prevent rotation of the sleeve as will be appreciated.

In view of the premises it will be appreciated that my invention provides means whereby lost motion between the cams and the oscillating shaft of the steering mechanism may be readily taken up as the parts wear and become loose, and the steering mechanism as a whole kept properly adjusted in such a manner that there will be no lost motion or back lash between the steering wheel and the transverse shaft; as well also as a construction wherein such variations in size as occur in the parts may be compensated for as the mechanism is assembled, and a properly operating mechanism free from lost motion thereby secured.

Having thus described and explained my invention, I claim and desire to secure by Letters Patent:

1. In steering mechanism of the class described, a rotatable steering shaft; two oppositely arranged cam members carried by said shaft and located adjacent the lower end thereof; an oscillating shaft located adjacent said cams and extending transverse to said steering shaft, and which shaft is provided with a bearing surface which is inclined relative to the axis thereof and against which surface both the cams aforesaid bear; and means for moving said oscillating shaft along its axis to thereby adjust said bearing surface relative to said cams.

2. In steering mechanism of the class described, a rotatable steering shaft; two oppositely arranged cam members carried by said shaft and located adjacent the lower end thereof; an oscillating shaft located adjacent said cams and extending transverse to said steering shaft, and which shaft is provided with a bearing surface which is inclined relative to the axis thereof and against which both the cams aforesaid bear; a rotatable threaded sleeve associated with said oscillating shaft; a stationary collar with which said sleeve is in threaded engagement; and means for holding said sleeve in whatever position it may be placed.

3. In steering mechanism of the class described, a rotatable steering shaft; two oppositely arranged cam members carried by said shaft and located adjacent the lower end thereof; an oscillating shaft located adjacent said cams and extending transverse to said steering shaft; a rotatable disc carried by said oscillating shaft and against which both the cams aforesaid bear, and the surface of which disc is inclined relative to the axis of said oscillating shaft; and means for moving said oscillating shaft along its axis to thereby adjust said bearing disc relative to said cam.

4. In a steering mechanism of the class described, a rotatable steering shaft; two oppositely arranged cam members carried by said shaft and located adjacent the lower end thereof; an oscillating shaft located adjacent said cams and extending transverse to said steering shaft; a bearing plate carried by said oscillating shaft and the under surface of which is arranged at an angle relative to the axis of said shaft, and against which bearing plate both the cams aforesaid bear; and means for moving said oscillating shaft along its axis to thereby adjust the bearing surface thereof relative to said cams.

5. In steering mechanism of the class described, a suitable casing; a rotatable steering shaft supported in bearings in said casing; two oppositely arranged cam members carried by said shaft and located within said casing; an oscillating shaft located adjacent said cams and extending transverse to said steering shaft, and which shaft is supported in a bearing carried by said casing and in a second bearing carried by a removable head member secured to said casing; a bearing member carried by said oscillating shaft and located within said casing and inclined relative to the axis of said shaft and against which both the cams aforesaid bear; an internally threaded collar carried by said head member; a rotatable sleeve carried by said oscillating shaft and which sleeve is in threaded engagement with said collar; and locking means for preventing said sleeve from movement after the parts have been properly adjusted.

6. In steering mechanism of the class described, a rotatable steering shaft; two oppositely arranged cam members carried by said shaft and located adjacent the lower end thereof; an oscillating shaft located adjacent said cams and extending transverse to said steering shaft; means carried by said oscillating shaft and inclined relative to the axis thereof and engaged by both the cams aforesaid, and through which motion is communicated to said oscillating shaft as said steering wheel is rotated; and means for moving said oscillating shaft along its axis to thereby adjust the bearing surface thereof relative to said cams.

In testimony whereof I affix my signature.

HARRY M. DENYES.